United States Patent [19]

Robillard et al.

[11] Patent Number: 4,561,619

[45] Date of Patent: Dec. 31, 1985

[54] MOVABLE CRT PEDESTAL

[75] Inventors: David R. Robillard, Westboro; Robert J. Bullock, Chelmsford; Jerry C. Marino, Sudbury, all of Mass.

[73] Assignee: Prime Computer, Inc., Natick, Mass.

[21] Appl. No.: 578,795

[22] Filed: Feb. 10, 1984

[51] Int. Cl.⁴ .............................................. E04G 3/00
[52] U.S. Cl. ................................. 248/285; 108/143; 248/349; 248/661
[58] Field of Search .............. 248/349, 371, 285, 279, 248/660, 661, 430, 276, 278, 284, 184, 372.1, 183; 108/143, 102; 273/148 B, DIG. 28; 16/106, 107

[56] References Cited

U.S. PATENT DOCUMENTS

| | | | |
|---|---|---|---|
| 794,809 | 7/1905 | Marsh | 108/143 |
| 2,182,703 | 12/1939 | Rainwater | 108/143 X |
| 2,807,058 | 9/1957 | Morgan | 16/106 |
| 3,151,349 | 10/1964 | Urquhart | 16/106 |
| 3,393,648 | 7/1968 | Diehr | 108/102 X |
| 3,399,856 | 9/1968 | Pecaut | 248/279 |
| 3,495,519 | 2/1970 | Alfsen et al. | 108/143 X |
| 4,305,563 | 12/1981 | Presson | 248/349 |
| 4,328,713 | 5/1982 | Lund | 248/661 X |
| 4,410,159 | 10/1983 | McVicker et al. | 248/183 X |

Primary Examiner—J. Franklin Foss
Assistant Examiner—David L. Talbott
Attorney, Agent, or Firm—Lahive & Cockfield

[57] ABSTRACT

A support for a CRT monitor provides translational movement for the monitor in two perpendicular directions. The support is on rollers for movement over a horizontal surface, and includes telescoping arms for movement in a first direction. One of the arms enters an elongate guide channel mountable on the surface and includes rollers for rolling along a vertical wall of the channel so that the support moves in a second direction perpendicular to the first. The channel includes a cover and end walls.

9 Claims, 6 Drawing Figures

MOVABLE CRT PEDESTAL

This application relates generally to supports for CRT monitors and particularly to supports for such monitors that allow translational movement of the monitor in two perpendicular directions.

In many uses of computers that are interactive, the computer user stays in a relatively fixed position near a keyboard or other input terminal while viewing the CRT monitor. In CAD/CAM work, for example, the user may interact with the CRT monitor with a keyboard, a tablet (sensor) and stylus, or a joystick. All these input terminals may be at one work station, in an array about the computer user. For relief from the physical strain of using the input elements at exactly the same place for an entire work period, the computer user will shift and rearrange the input terminals to vary his or her physical relationship with the elements.

It is desirable at such a work station to be able to shift the position of the CRT monitor as well. A different position of the CRT monitor may be required by a rearrangement of the input elements, or it may just be desirable to shift the position of the monitor to change how the viewer holds his or her head while looking at the monitor. In fact, rearrangement of the CRT monitor's position is one of the most important sources of relief possible for a computer user.

The monitor, however, is a heavy piece of equipment. To fix it in a movable support requires a careful balance between a strong support that will hold the monitor securely and keep it within certain bounds (i.e., keep it from falling off a desk) and a support that will allow rearrangement of the monitor's position fairly easily, at a slight touch by the computer user.

The prior art has devised a range of mechanisms for moving CRT monitors or equipment like CRT monitors. It is an object of this invention to provide improved, reliable and suitably sturdy weight-bearing devices on which a CRT monitor may be mounted to be moved easily around a work station.

One prior art device comprises a platform on a series of pivoting arms that mounts on a post attached to a work surface such as a desk. The device has two horizontal arms pivotally connected to each other at a central swivel joint, another swivel joint at the end of one of the arms for connection to the post, and a third swivel joint at the end of the other arm supporting a monitor platform. Such a device theoretically allows the monitor to be adjusted to almost any position, but it is limited by the length of the arms. Furthermore, particularly when the arms line up, it may require two hands to shift and move the monitor, and it sometimes requires manipulating the arms and all the swivel joints just to move the monitor only a few inches one way or the other.

SUMMARY OF THE INVENTION

The invention provides a system for supporting and moving a CRT monitor on a horizontal surface that comprises an extendable supporting means for supporting the monitor, movement means arranged on the supporting means for providing movement of the supporting means on the horizontal surface, and an elongate guide means mountable on the horizontal surface, the supporting means being mounted on the elongate guide means for movement in a first direction parallel to the guide means, the extendable supporting means being extendable in a second direction perpendicular to the first direction.

In preferred embodiments the supporting means comprises first and second arms in telescoping arrangement with each other, telescopable in the second direction, the movement means comprises a first rolling means mounted on the supporting means and rollable on the horizontal surface, the elongate guide means comprises a channel means including at least one vertical wall parallel to the guide means, and the supporting means includes a portion extending into the channel means.

Also, the system includes second rolling means mounted on the supporting means and rollable on the vertical wall, and third rolling means mounted on the supporting means and rollable on the horizontal surface within the channel means. The channel means also preferably includes a cover overlaying the supporting means portion extending into the channel means, and stop means at the ends of the channel means. The supporting means also preferably includes a tilt and swivel means for tilting and swivelling the monitor.

BRIEF DESCRIPTION OF THE DRAWING

Other objects, features and advantages of the invention will be apparent from the following description of a preferred embodiment of the invention, including the drawings thereof, in which.

DESCRIPTION OF A PREFERRED EMBODIMENT

Figure 1:
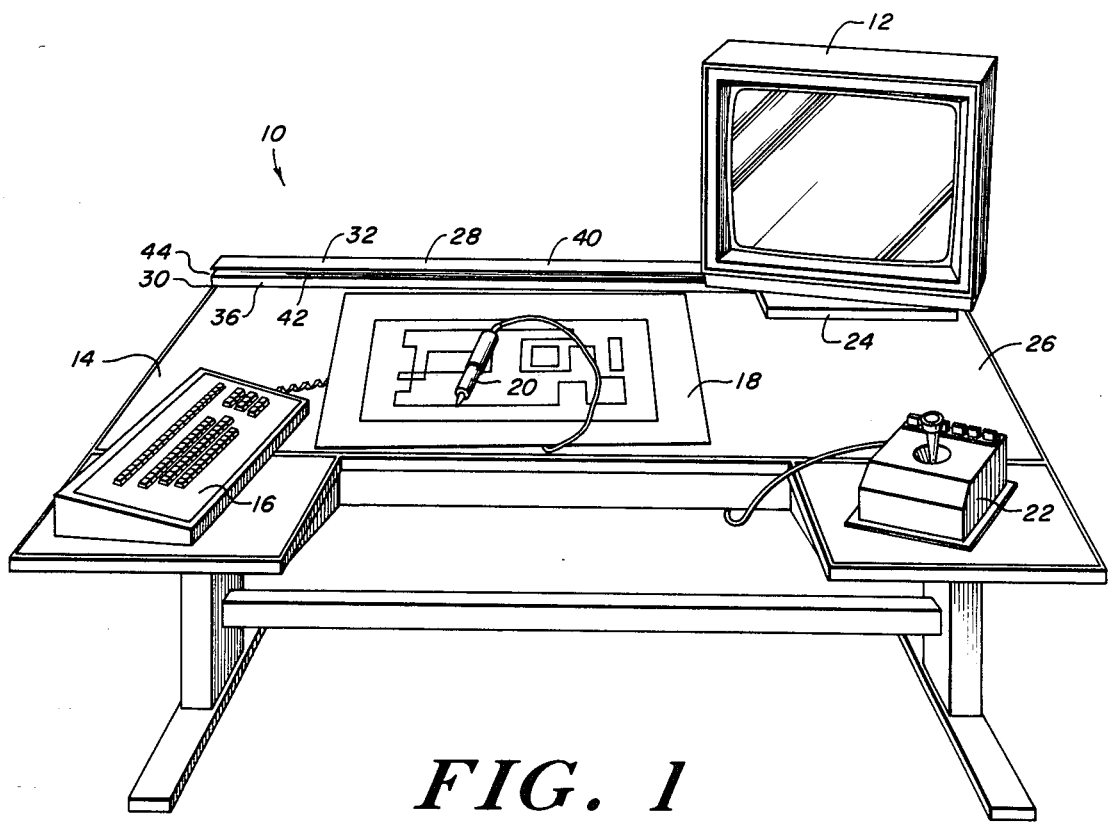
FIG. 1 is a perspective view of a CAD/CAM work station with a monitor on a support embodying the invention.
Figure 2:
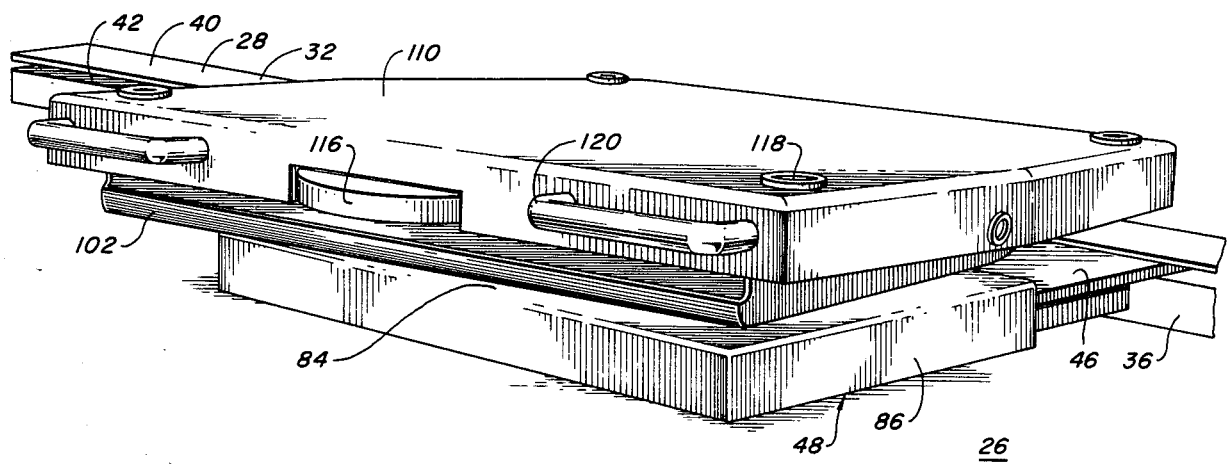
FIG. 2 is a perspective view of the support of FIG. 1.
Figure 3:
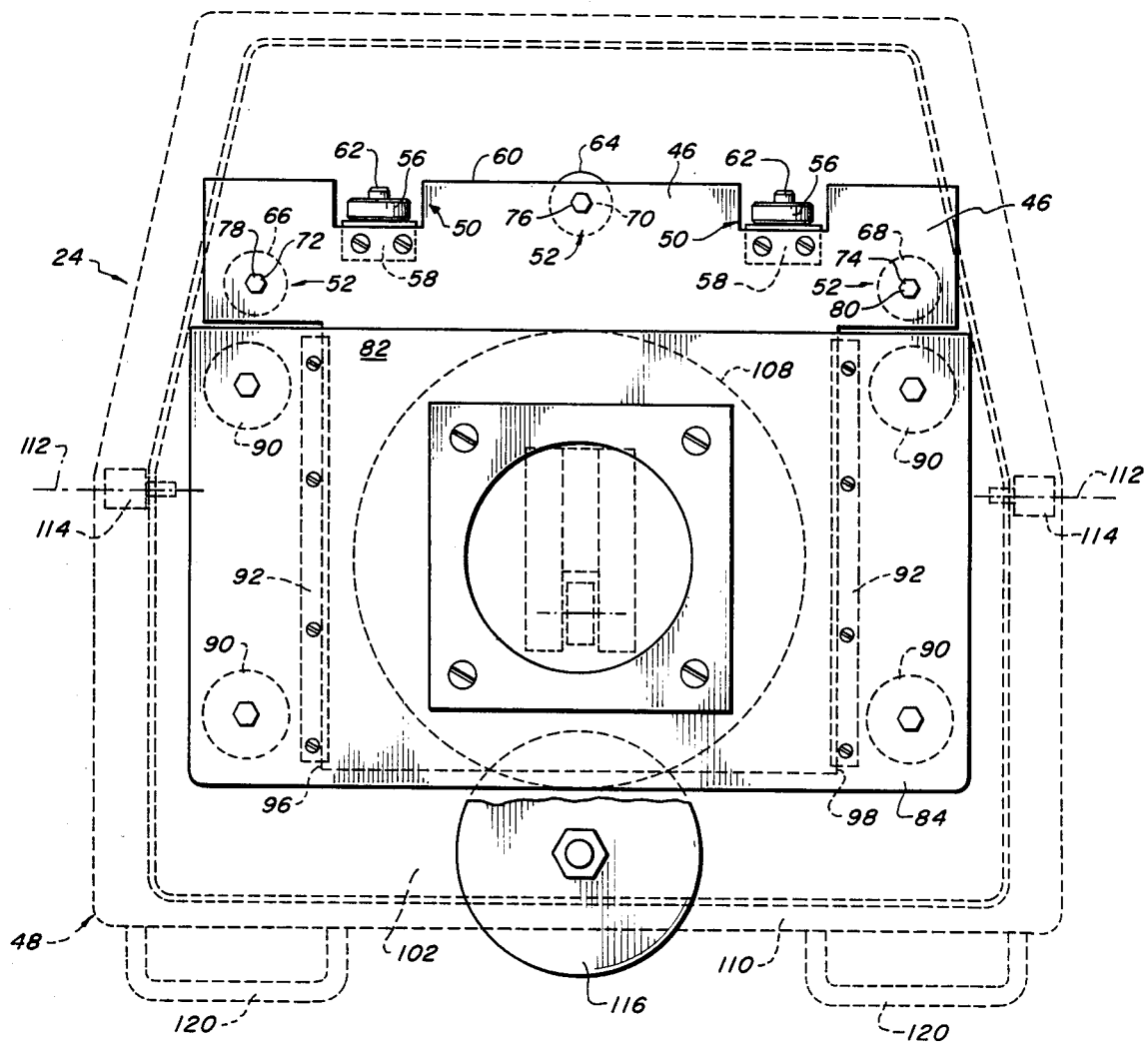
FIG. 3 is a top view of the support.

There is shown in FIG. 1 a typical CAD/CAM work station 10, with a CRT monitor 12 on a table 14, and, in front of the monitor 12, various input devices, such as a keyboard 16, a tablet 18 and stylus 20 and a joystick 22. The monitor 12 is seated on a support 24 to allow its movement over the table's horizontal surface 26 toward and away from an elongate guide 28, mounted at the rear 30 of the table 14, in a first direction, and sideways, parallel to the guide 28 in a second direction perpendicular to the first.

The guide 28 at the rear 30 of the table 14 allows movement of the support 24 parallel to the guide 28. The guide 28 is formed by a channel 32 formed from sheet metal, and, in cross section, has a floor 34 corresponding to the table surface 26, short front and back vertical walls 36, 38, and a removable cover 40. The cover 40 is mounted on the guide channel 32 in any conventional manner—and leaves a front slot 42 through which a portion of the support 24 enters the channel 32. The ends of the channel 32 are closed off by end walls 44 or, alternatively, some form of internal stops.

Figure 4:
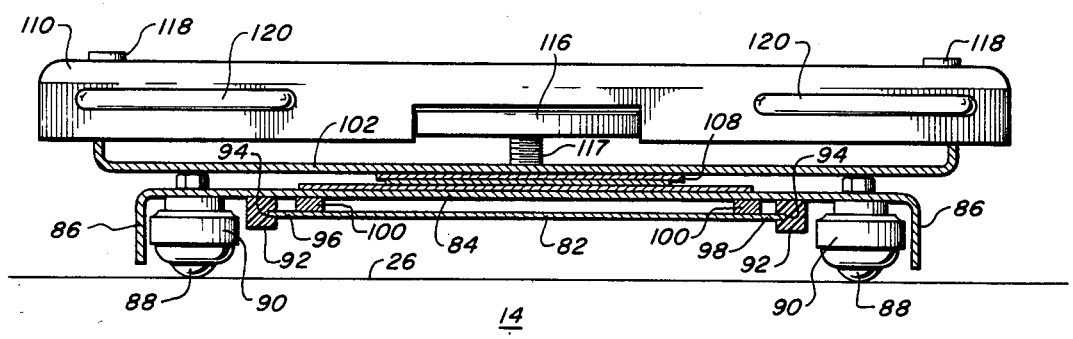
FIG. 4 is a front view of the support.
Figure 5:
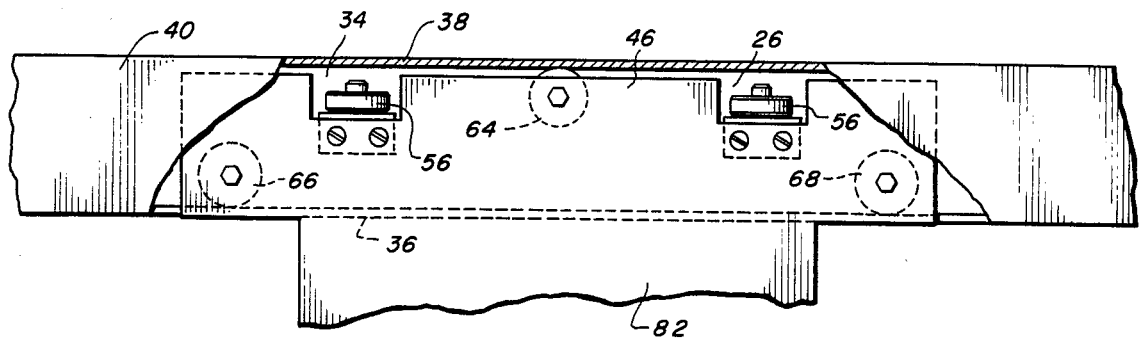
FIG. 5 is a top view of the portion of an arm of the support in a guide channel, with the cover of the channel partially broken away.
Figure 6:
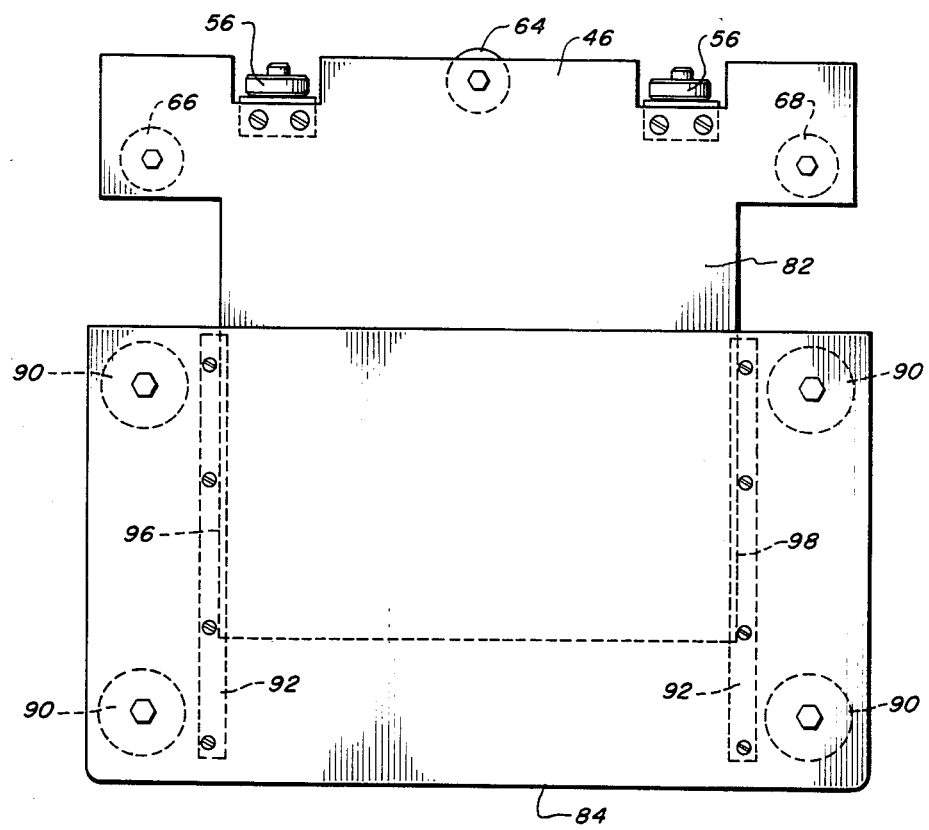
FIG. 6 shows the extended position of the telescoping elements of the monitor support.

As shown in FIGS. 4 and 5, the portion of the support 24 entering the channel 32 is part of the rear arm 46 of a support assembly 48. The rear arm 46 is substantially a planar metal sheet. Mounted on the portion of the rear arm 46 in the slot 42 are wheel assemblies 50, 52 for guiding the support 24 in its movement parallel to the channel 32.

The rear support wheel assemblies 50 include two plastic wheels 56 that are mounted in spaced apart wheel mountings 58 near the rear edge 60 of the arm 46 so that the wheels 56 have horizontally disposed axles 62 perpendicular to the channel. These rear support wheels 56 support the rear arm 46 by riding on, in effect, the horizontal surface of the table 14.

The guide wheel assemblies 52 include three plastic wheels 64,66,68 that are mounted in spaced apart wheel mountings 70,72,74 beneath the arm 46 so that the wheels 64,66,68 have vertically disposed axles 76,78,80. One wheel 64 is centrally located near the rear edge 60 of the arm 46 so that it rides along the rear vertical wall 38 of the channel 32. The other two wheels 66,68 are spaced apart and located near the front vertical wall 36 of the channel 32 to ride against that wall during sideways movement of the support assembly 48.

The cover 40 of the channel 32 is removable to allow the wheel assemblies 50,52 and rear portion of the rear arm 46 to be placed in the channel 32. The cover 40 of the channel 32 in place protects the wheel assemblies 50,52 from dust and also prevents the possibility of the rear arm 46 popping out of the channel 32 inadvertently. Thus, the support assembly 48 is captured by the channel 32.

The rear arm 46 has a narrower forwardly projecting portion 82. Telescopingly arranged on this forwardly projecting portion 82 is another arm forming a bottom plate 84 of the support assembly. The bottom plate 84, a plate generally rectangular in shape with a downwardly extending skirt 86 on either side, has four caster wheels 88 mounted underneath, in assemblies 90 approximately at the corners of the plate 84. These caster wheels 88 roll on the horizontal surface 26 of the table 14 and support the bottom plate 84 thereon.

The bottom plate 84 has two elongate plastic slider blocks 92 mounted beneath the plate 84 on either side of the forwardly projecting portion 82 of the rear arm 46. The blocks 92 define elongate slots 94 within which the left and right edges 96,98 of the forwardly projecting portion 82 are slidable, thereby creating the telescoping relationship between the front arm, or bottom plate 84, and the rear arm 46. Spacer blocks 100 are mounted atop the forward portion 82, spacing the arm 46 from the bottom plate 84 above it.

A planar swivel pan 102 is arranged on the bottom plate 84 for rotation of the pan 102 about a central vertical axis. The pan 102 rests on a circular ring 108 to facilitate rotation. Finally, an upper pivot plate 110 is pivotally mounted on the swivel pan 102 for rotation about a horizontal axis 112 parallel to the channel 32. Pivot blocks 114, not shown in detail, are mounted on the swivel pan 102 on either side and in turn support the pivot plate 110 for the aforementioned pivotal movement. The pivoting and swivelling movements of the monitor 12 are typically performed only to eliminate glare and do not have a great impact on the bodily comfort of the user of the computer work station.

The pivoting of the pivot plate 110 is typically adjusted by a large thumb wheel 116 protruding from the front of the pivot plate 110, which manipulates a screw 117 adjusting the height of the front of the pivot plate 110.

The pivot plate 110, the uppermost plate of the support assembly 48, has four ring-like protrusions 118 in the corners of the upper surface to correspond to the pads of the intended monitor 12 and prevent a monitor slipping off the plate 110. The plate 110 also has a pair of handles 120 projecting from the front of the plate 110 so that it can be easily manipulated.

In use then, the monitor 10 is placed on the pivot plate 110 of the support assembly 48. The monitor 10 may be tilted and swivelled to eliminate glare. Then when the position of the monitor 10 is to be changed, the handles 120 are grasped and the monitor 10 is pushed to a desired new location. The location is easily determined and arrived at, since the pedestal arrangement allows independent movement along two axes—one perpendicular to the channel, i.e., in and out, or forward and back, and the other parallel to the channel, i.e., sideways.

In the meantime, the monitor 10 is supported for rolling movement by the wheels 88 on the support assembly 48. The support assembly 48 is captured by the guide channel 32, and, in particular, cannot roll off the table 14.

Modifications to the illustrative embodiment described above may be made without departing from the spirit and scope of the invention, which is defined by the following claims.

What is claimed is:

1. A system for supporting and moving a CRT monitor on a horizontal surface comprising:
    an extendable supporting means for supporting said monitor,
    movement means arranged on said supporting means for providing movement of said supporting means on said horizontal surface, and
    an elongate guide means mountable on said horizontal surface,
    said supporting means being mounted on said elongate guide means for movement in a first direction parallel to said guide means,
    said extendable supporting means being extendable in a second direction perpendicular to the first direction.

2. The system of claim 1 wherein said supporting means comprises first and second arm means in telescoping arrangement with each other, telescopable in said second direction.

3. The system of claim 1 wherein said movement means comprise first rolling means mounted on said supporting means and rollable on said horizontal surface.

4. The system of claim 1 wherein said elongate guide means comprises a channel means including at least one vertical wall parallel to said guide means.

5. The system of claim 4 including second rolling means mounted on said supporting means and rollable on said vertical wall.

6. The system of claim 4 including third rolling means mounted on said supporting means and rollable on said horizontal surface within said channel means.

7. The system of claim 4 wherein said supporting means includes a portion extending into said channel means and said channel means includes a cover means overlaying said portion.

8. The system of claim 4 wherein said channel means includes stop means at the ends of said channel means.

9. A system for supporting and moving a CRT monitor on a horizontal surface, comprising:
    a supporting means for supporting said monitor,
        first rolling means mounted on said supporting means and rollable on said horizontal surface for providing movement of said supporting means on said horizontal surface, an elongate channel means mountable on said horizontal surface, said supporting means having a portion extending into said channel means and mounted on said elongate channel means for movement in a first direction parallel to said channel means, said channel means including at least one vertical wall parallel to said channel means, stop means at the ends of said channel means, and cover means overlaying said supporting means portion, second rolling means mounted on said supporting means and rollable on said vertical wall, and third rolling means mounted on said supporting means portion and rollable on said horizontal surface within said channel means.

* * * * *